W. E. JOHNSON.
ELECTRIC HEATER FOR STOCK WATERING TANKS.
APPLICATION FILED AUG. 16, 1919.
Patented Mar. 16, 1920.
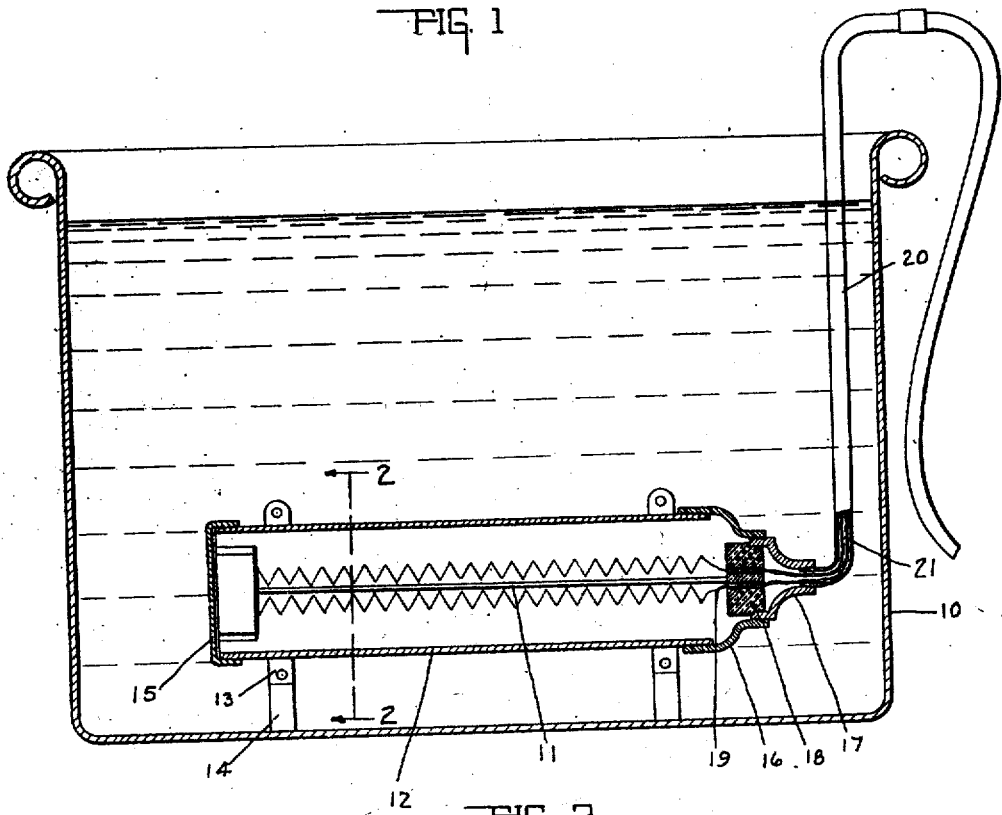
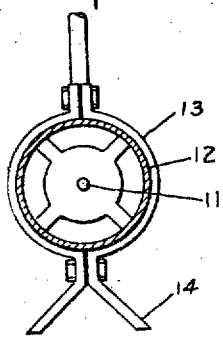
INVENTOR.
WILSON E. JOHNSON.
BY
*Lockwood Lockwood*
ATTORNEYS.

UNITED STATES PATENT OFFICE.

WILSON E. JOHNSON, OF KEMPTON, INDIANA.

ELECTRIC HEATER FOR STOCK-WATERING TANKS.

1,334,035.  Specification of Letters Patent.  Patented Mar. 16, 1920.

Application filed August 16, 1919. Serial No. 317,918.

*To all whom it may concern:*

Be it known that I, WILSON E. JOHNSON, a citizen of the United States, and a resident of Kempton, county of Tipton, and State of Indiana, have invented a certain new and useful Electric Heater for Stock-Watering Tanks; and I do hereby declare that the following is a full, clear, and exact description thereof, reference being had to the accompanying drawings, in which like numerals refer to like parts.

This invention relates to a heating element adaptable for use in large bodies of water, such as live stock watering tanks, reservoirs and the like.

The main object of the invention is to provide a heating element which may be placed in the bottom of a large tank of water for heating it, will be inclosed by a water tight housing for preventing its coming in contact therewith, and will be of such construction that the wires or cable connecting with the heating element may extend down into the tank and be protected from contact with the water so that the heating element and the cable leading thereto will not be influenced thereby. The water tight housing is for the purpose of protecting the element from a scale, which forms on such element when exposed to the water. The scale crystallizes and becomes hard, reducing the efficiency of the heater, being formed from the salts present in the water.

Referring to the drawings, which are made a part of this application, Figure 1 is a longitudinal section through a tank of water and the housing of the heating element. Fig. 2 is a cross section taken on the line 2—2 of Fig. 1.

There is shown herein a water tank 10 such as is used for watering live stock, in which it is desired to keep the water heated to a temperature most suitable for drinking purposes. The heating element 11 of the resistance type is contained in a housing consisting of a tube 12 supported in the brackets 13 which are provided with legs 14, whereby said housing may rest upon and be supported by the bottom of the tank. One end of the tube 12 is closed by the screw cap 15 which is screwed thereon and made water tight, while the other end is provided with a shouldered ring 16 adapted to be screwed thereon and tapering outwardly, in which a reduced connecting member 17 is adapted to be screwed. The connecting member 17 has mounted therein an insulating block 18 through which the wires 19 pass for spacing them apart before being connected with the terminals of the heating element 11.

Connecting with the connecting member 17 there is a pipe 20 through which the cable 21 extends from the insulating block 18 for protecting it from the water and retaining it in a dry state. The cable 21 is connected to any suitable source of current not shown herein, the current being supplied in most cases by the electric lighting plants now present on most farms.

The invention claimed is:

A fluid heater having a longitudinally extending electric heating unit with adjacent terminals, a tubular fluid-tight housing surrounding said unit and having one end thereof closed, said housing being provided at each end with brackets to support the heater longitudinally near the bottom, of a fluid containing vessel, a fluid-tight connecting member mounted on the other end of said tubular housing and having a reduced end, an insulating block mounted in said connecting member and having a fluid-tight connection therewith, a pipe connected with the reduced end of said connecting member and extending beyond the fluid containing vessel, and a cable extending through said pipe and said connecting member and insulated therefrom and having terminals extending in spaced relation into said insulating block to contact said heating unit terminals, said heating element and terminals and cable being protected from contact with the fluid.

In witness whereof I have hereunto affixed my signature.

WILSON E. JOHNSON.